United States Patent
Daouse

[19]

[11] Patent Number: 5,888,567
[45] Date of Patent: Mar. 30, 1999

[54] PROCESS AND APPARATUS FOR MANUFACTURE OF A CO-EXTRUDED ICED CONFECTION

[75] Inventor: Alain Daouse, Noailles, France

[73] Assignee: Nestec S. A., Vevey, Switzerland

[21] Appl. No.: 837,008

[22] Filed: Apr. 11, 1997

[30] Foreign Application Priority Data

Apr. 12, 1996 [EP] European Pat. Off. ............. 96200987

[51] Int. Cl.$^6$ .............................. B29C 47/06; A23L 1/27
[52] U.S. Cl. .......................... 426/249; 426/516; 426/101; 426/134; 425/133.1
[58] Field of Search .................................. 426/249, 134, 426/516, 100, 101, 448, 449, 660; 425/133.1

[56] References Cited

U.S. PATENT DOCUMENTS

| | | | |
|---|---|---|---|
| 608,958 | 8/1898 | Ferraioli | 425/133.1 |
| 2,239,165 | 4/1941 | Adams | 426/249 |
| 2,246,871 | 6/1941 | Balch | 426/249 |
| 2,284,651 | 6/1942 | Gundlach et al. | 426/249 |
| 2,313,060 | 3/1943 | Friedman | 425/133.1 |
| 2,334,052 | 11/1943 | Wedin | 426/249 |
| 2,479,261 | 8/1949 | Reetz | 425/133.1 |
| 2,576,842 | 11/1951 | Lehner | 426/249 |
| 2,646,757 | 7/1953 | Hackmann | 426/249 |
| 2,689,537 | 9/1954 | Peyton | 426/249 |
| 2,722,177 | 11/1955 | Routh | 425/133.1 |
| 2,774,314 | 12/1956 | Moser | 426/249 |
| 3,014,437 | 12/1961 | Dutchess | 425/133.1 |
| 3,241,503 | 3/1966 | Schafer | 425/133.1 |
| 3,295,466 | 1/1967 | Bell et al. | 426/249 |
| 3,689,280 | 9/1972 | Werner | 426/249 |
| 3,876,743 | 4/1975 | Soderlund et al. | 426/249 |
| 3,991,217 | 11/1976 | Kinney | 426/249 |
| 4,001,439 | 1/1977 | Zonni et al. | 426/249 |
| 4,259,051 | 3/1981 | Shatila | 426/516 |
| 4,504,511 | 3/1985 | Binley | 426/249 |
| 4,642,241 | 2/1987 | Noguchi | 426/516 |
| 4,659,580 | 4/1987 | Svengren | 426/516 |
| 4,835,000 | 5/1989 | Kehoe | 426/249 |
| 4,871,566 | 10/1989 | Farnum et al. | 426/516 |
| 4,873,104 | 10/1989 | Butcher et al. | 426/249 |
| 5,013,575 | 5/1991 | Stadler et al. | 426/516 |
| 5,198,239 | 3/1993 | Beavers | 425/133.1 |
| 5,343,710 | 9/1994 | Cathenaut et al. | 62/71 |
| 5,356,648 | 10/1994 | Kortschot | 426/249 |
| 5,374,436 | 12/1994 | White et al. | 426/249 |
| 5,425,958 | 6/1995 | Fazio et al. | 426/249 |
| 5,582,856 | 12/1996 | White et al. | 426/249 |
| 5,759,603 | 6/1998 | Francisco et al. | 426/249 |

*Primary Examiner*—Cynthia L. Nessler
*Attorney, Agent, or Firm*—Vogt & O'Donnell

[57] ABSTRACT

Articles of frozen confectionery which provide a spiral pattern are obtained by extruding frozen confectionery material through a plurality of nozzle member tubes which are aligned successively and which each have a shape to provide a product which has a shape which includes an arc portion and a tangent portion, the arc portion extending from the tangent portion so that the arc portion is defined thereby as two semi-circular portions of differing diameter connected by the tangent portion. Each successive tube of the plurality of aligned tubes has an interior cross-section hollow larger than the cross-section hollow of the preceding tube, and each preceding tube is fitted into the succeeding tube to deliver extrudate within the suceeding tube and additional frozen confectionery material is introduced into each successive tube to add layers to the product.

12 Claims, 3 Drawing Sheets

PROCESS AND APPARATUS FOR MANUFACTURE OF A CO-EXTRUDED ICED CONFECTION

BACKGROUND OF THE INVENTION

The invention concerns a process and a device for manufacturing extruded frozen confectionery with contrasting colourings and flavours defining a spiral, intended to fill family portions or "bulk" portions or pots or moreover for the manufacture of frozen lollies.

A device is known, for example from European Patent Application Publication No. 0 293 022, for filling portions of frozen confectionery containing a sauce or a syrup with which a contrasting design is produced in a double spiral or double concentric circles by means of a hollow rotating shaft placed axially in a tube and comprising lateral openings, while the tube comprises a central deflector element in the vicinity of the outlet delivery tube. The hollow shaft produces a pattern consisting of concentric circles of syrup which the deflector divides into two sub-patterns.

According to U.S. Pat. No. 3227103, for example, two pastry doughs are extruded, each through delivery tubes defining a spiral inscribed in a circular contour, so as to manufacture cakes of the "Swiss rolls" type. Such a device does not allow two frozen compositions to be co-extruded in the form of a spiral inscribed in a circle with correct definition of the contour of the spiral pattern, since it creates preferential flows which distort this pattern by reason of the high friction in the delivery tube in the form of a spiral and at the center of the pattern in relation to the periphery.

SUMMARY OF THE INVENTION

The present invention provides a simple solution to the problem presented by means of a device which does not have moving parts.

The present invention provides a device for extruding a frozen confectionery by co-extrusion of frozen compositions having distinct flavours and colours to form a cylindrical extrusion having at its core a spiral pattern, characterized in that it comprises successive nozzles fitting inside each other and having a progressive section, in that each nozzle is formed of two cylindrical half-shells attached by a center plane of the extrusion and in that the section of the nozzles consists of two tangential semi-circles attached by their diameters in the said center plane, with the exception of the last outlet nozzle whose section is circular.

The present invention also provides a process for manufacturing frozen confectionery by co-extrusion of frozen compositions having distinct flavors and colors to form a cylindrical extrusion having at its core a spiral pattern, characterized in that frozen compositions are extruded vertically and alternately by successive nozzles fitting inside each other and having a progressive section, in that each nozzle is formed of two cylindrical half-shells attached by a centre plane of the extrusion and in that the section of the nozzles consists of two tangential semi-circles attached by their diameters in the said center plane, with the exception of the last outlet nozzle whose section is circular.

The invention also concerns a frozen article of confectionery extruded in a generally cylindrical form characterized in that it consists of at least two frozen compositions with contrasting flavours and colours and in that these define a pattern in its transverse section representing a spiral inscribed in a circle.

DETAILED DESCRIPTION OF THE INVENTION

A frozen composition is understood to mean, within the context of the invention, an ice cream properly so-called, which is aerated to a variable extent, or an extrudable sorbet or water ice which is not aerated or aerated only to a small extent.

The extrudate is preferably cut into portions on leaving the extrusion device to be then introduced into containers, for example boxes or pots which are presented successively under the device, a portion then constituting the exact volume for filling the container in question. The containers are supported by a chain which progresses step-wise, so that a container is stationary during the period of filling. As a variant, it can be arranged that the extrusion device is fixed, for example to a movable trolley, so that it accompanies a container during filling, and then once the container is filled, rapidly returns to its initial position.

As a variant, the extrusion may be cut into slices which are deposited on cold plates travelling continuously under the extrusion device and in which it is possible to insert a stick laterally so as to produce ice lollies.

The frozen compositions preferably have contrasting flavours and colours and have similar rheological properties, which can be obtained by adjusting the flow, composition, overrun, outlet temperature and extrusion pressure. In principle, these physical parameters are very similar for the various compositions.

According to one embodiment, the article of the present invention is in the form of a generally cylindrical pot with a small relief angle, containing a cylindrical extrudate of frozen compositions in the section of which is inscribed a spiral.

According to another embodiment, the article is in the form of an ice lolly comprising a cylindrical slice of frozen compositions cut from the extrudate leaving the extruder, in the section of which is inscribed a spiral and in which is disposed a stick.

The invention is described in detail with the aid of the accompanying drawings given by way of illustration.

BRIEF DESCRIPTION OF THE DRAWING FIGURES

Figure 3:
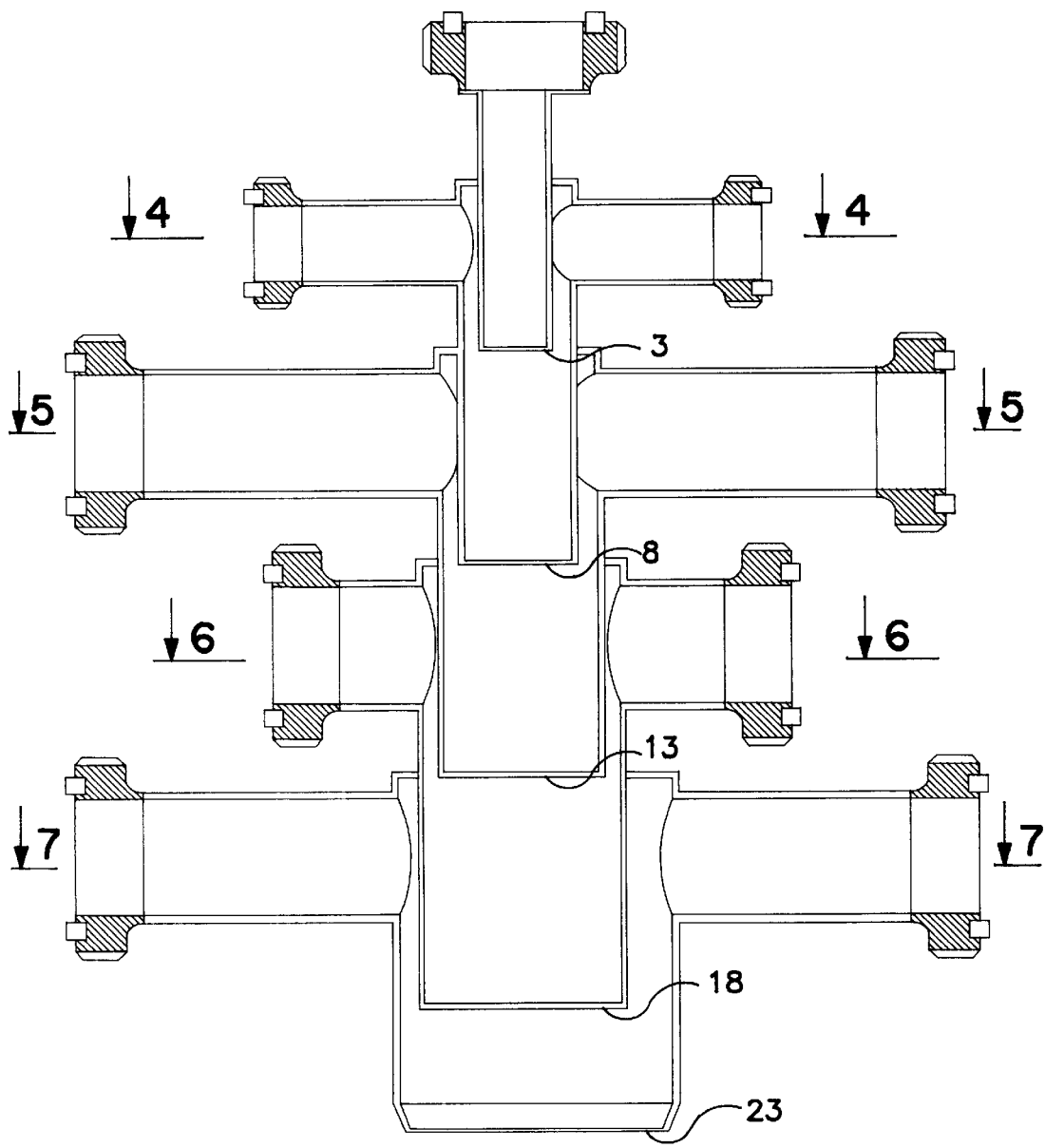
FIG. 3 is a longitudinal section of the device along a center plane.
Figure 4:
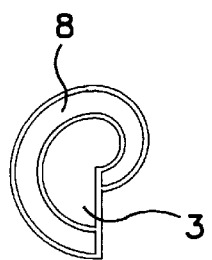
Figure 5:
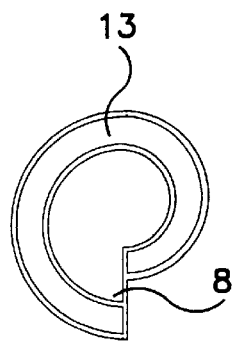
Figure 6:
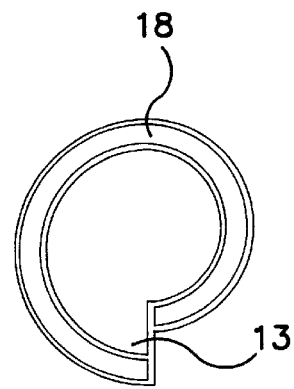

FIGS. 4, 5, 6, and 7 are lateral sections, along 4—4, 5—5, 6—6 and 7—7 respectively of FIG. 3.

Figure 8:
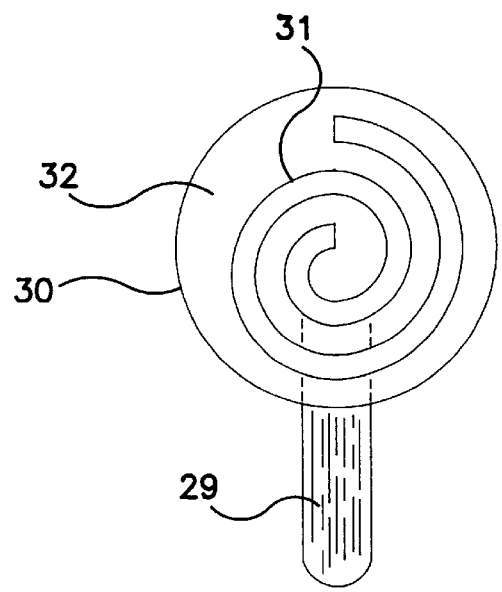

FIG. 8 is a view in elevation of an ice lolly.

DETAILED DESCRIPTION OF THE DRAWING FIGURES

Figure 1:
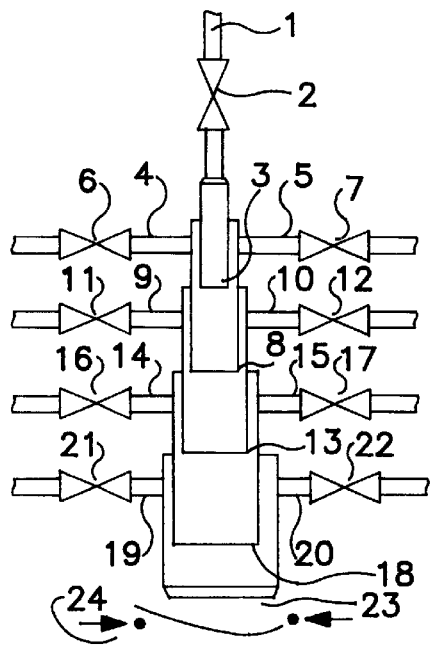
FIG. 1 is a diagrammatic view of the station for filling containers.

In FIG. 1, an ice cream having a first flavour, for example vanilla, arrives vertically through the pipe 1, at a flow rate regulated by the valve 2, through a central delivery tube 3. An ice cream with a second flavour, for example chocolate, arrives laterally and from each side through the pipes 4 and 5 at a flow rate regulated by the valve 6 and 7 into a space surrounding the delivery tube 3, and the assembly of two co-extruded streams leaves through the delivery tube 8. In the same way, a vanilla ice cream arrives laterally through the pipes 9 and 10, at a flow rate regulated by the valves 11 and 12 into a space surrounding the delivery tube 8, and the assembly of three co-extruded streams leaves through the delivery tube 13. In the same way, a chocolate ice cream arrives laterally through the pipes 14 and 15, with a flow rate regulated by the valves 16 and 17 into a space surrounding the delivery tube 13, and the assembly of four co-extruded streams leaves through the delivery tube 18. In the same way, a vanilla ice cream arrives laterally through the pipes 19 and 20, with a flow rate regulated by the valves 21 and 22, into a space surrounding the delivery tube 18, and the assembly of five co-extruded streams leaves through the outlet delivery tube 23 and constitutes the final extrudate.

As will be gathered from the foregoing and from the drawing figures, therefore, each of the successive nozzle delivery tubes which supply the outlet delivery tube 23 extends from a first end opening to a second end opening and has an interior solid wall surface which circumscribes a hollow.

The valves 2, 6, 7, 11, 12, 16, 17, 21 and 22 may be controlled independently from each other or by means of a single control system.

The final extrudate is cut into portions with a volume adapted to the contents of a pot by the cutting tool 24, and then deposited in the pot 25, which is stationary during all the filling operation and which, once filled, is taken by the conveyor belt 26 which passes stepwise in the direction of the arrow f1.

Figure 2:
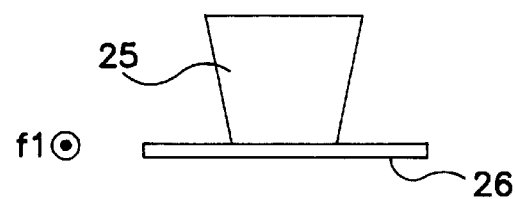
FIG. 2 is a diagrammatic view of a variant of the station for manufacturing lollies.
Figure 2:
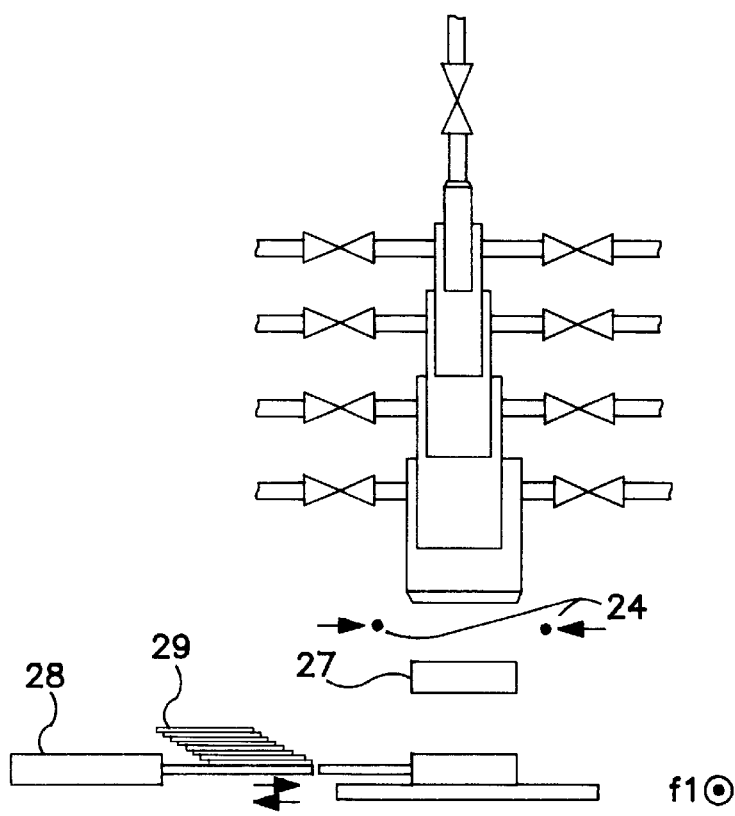

In FIG. 2, the extrudate is extruded in the same way as in FIG. 1 with the only differences being that the cutting tool 24 operates with a higher frequency and cuts sections such as 27, in which the stick applicator 28 inserts a stick 29 as it proceeds, and that the belt 26 takes the lollies along a continuous path in the direction of the arrow f1.

As is apparent in FIG. 3, the delivery tubes 3, 8, 13 and 18 of the successive nozzles are offset in the center plane of the extruder with respect to the extrusion axis, and hence the axis of the extrudate, whereas the final delivery tube 23 is in the axis of the extrudate.

In FIGS. 4 to 7, it will be seen that the delivery tubes 3, 8, 13 and 18, which also represent the section of the nozzles, may each be divided up into two tangential semi-circles attached by their diameters in the said center plane. This cross-section shape thereby comprises an arc portion and a tangent portion whereby the arc portion extends from the tangent portion and comprises, with reference to the tangent portion, two semi-circular portions of differing diameter connected by the tangent portion. On the other hand, the outlet delivery tube 23 is circular. It will thus be noted that the nozzles have sections which define, as it were, the negative of the spiral pattern.

This configuration of the nozzles enables successive co-extrusion to take place of extrusions consisting solely of attached semi-cylinders, hence with simple shapes, without the preferential flow which would come from the shear resulting from friction of the mass pushed against the walls.

Preferably, the section of a delivery tube such as 3, is substantially equal to the difference between the areas 8 and 3, that of the delivery tube 8 is substantially equal to the difference between the areas 13 and 8, that of the delivery tube 13 to the difference between the areas 18 and 13 and that of the delivery tube 18 to the difference between the areas 23 and 18, which means that there is no deformation of the successive co-extruded extrudate.

Figure 7:
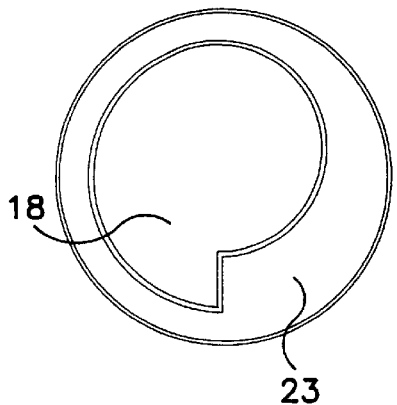

In FIG. 7, a section 30 of the co-extruded extrudate, provided with a stick 29, constitutes an ice lolly having a decorative appearance with a spiral 31 of chocolate ice cream inscribed in a mass 32 of vanilla ice cream.

In the previous detailed description, bi-component articles have been described based on two ice creams. It is possible to manufacture, without departing from the scope of the invention, articles composed of several ice creams with distinct colours and flavours, for example with up to nine distinct frozen compositions each defining a spiral sector, insofar as the spiral pattern would appear.

Elements composed of distinct sorbets or furthermore of ice creams and sorbets may be also juxtaposed, on condition that their rheological properties are similar.

Frozen compositions may contain small inclusions, for example chocolate chips, or may contain sauce or syrup marbling.

In addition, an ice lolly based on extrudable water ices or sorbets may be covered with water-based glazing so as to produce a glossy finish.

I claim:

1. An apparatus for co-extrusion of frozen compositions for preparation of a confectionery article comprising:

a plurality of nozzle member tubes aligned successively wherein each tube extends from one end opening to a second end opening and comprises an interior solid wall surface which circumscribes a hollow and which extends between the ends for extruding a material to obtain an extrudate product comprising an outer surface having a shape of the interior wall surface shape, wherein in cross-section with reference to an end-to-end axis, the interior wall surface cross-section shape comprises an arc portion and a tangent portion wherein the arc portion extends from the tangent portion and comprises, with reference to the tangent portion, two semi-circular portions of differing diameter connected by the tangent portion, wherein each successive tube has an interior cross-section hollow larger than the cross-section hollow of the preceding tube and wherein each preceding tube is fitted into the succeeding tube for delivering material through the plurality of successively aligned tubes; and a product outlet delivery tube member which comprises a cylindrical interior wall about a hollow which is larger than the hollows of the plurality of nozzle member tubes and which is positioned for receiving extrudate from the plurality of tubes.

2. An apparatus according to claim 1 wherein the apparatus comprises four successive nozzle member tubes.

3. An apparatus according to claim 1 wherein the nozzle member tubes are positioned one to another and with reference to a central axis of the cylindrical product outlet delivery tube member so that the nozzle member tubes are offset one to another and to the central axis.

4. An apparatus according to claim 1 further comprising pipes connected with the nozzle member tubes and cylindrical product outlet delivery tube member for delivering frozen confectionery to the nozzle member tubes and the cylindrical product outlet delivery tube.

5. An apparatus according to claim 4 wherein the pipes extend laterally from the nozzle member tubes and the cylindrical product outlet delivery tube member.

6. A process for manufacturing a frozen confectionery product comprising:

extruding frozen confectionery material through a first nozzle member tube to obtain a first extrudate product which extends vertically downward from the tube and so that the first product has, with respect to the vertical extent of the first extrudate product, an outer surface cross-section shape which comprises an arc portion and a tangent portion wherein the arc portion extends from the tangent portion and comprises, with reference to the tangent portion, two semi-circular portions of differing diameter connected by the tangent portion;

delivering the first extrudate product from the first nozzle member tube to a product outlet delivery tube member which comprises a cylindrical interior wall about a hollow via at least one further nozzle member tube and with respect to each further nozzle member tube, introducing the first product and additional frozen confectionery material within the further tube and extruding a product comprising the additional frozen confectionery material and the first product vertically downward so that a successively layered product is obtained wherein each successive layer has, with respect to the vertical extent of the layered product, an outer surface cross-section shape which comprises an arc portion and a tangent portion wherein the arc portion extends from the tangent portion and comprises, with reference to the tangent portion, two semi-circular portions of differing diameter connected by the tangent portion and so that each successive layer is positioned to form a spiral shape; and introducing further frozen confectionery into the product outlet delivery tube member and extruding the further frozen confectionery and the layered product so that the layered product cross-section outer surface is contained within further extrudate which has a circular cross-section shape.

7. A process according to claim 6 wherein the frozen confectionery is ice cream and ice creams which differ one from another are introduced into each further tube alternately.

8. A process according to claim 6 wherein the frozen confectionery is sorbet and sorbets which differ one from another are introduced into each further tube alternately.

9. A process according to claim 6 wherein the frozen confectionery is water-ice and water-ices which differ one from another are introduced into each further tube alternately.

10. A process according to claim 6 further comprising cutting the further extrudate products into portions.

11. A process according to claim 10 further comprising introducing a portion into a container.

12. A process according to claim 10 further comprising introducing a stick into a portion.

* * * * *